J. F. ADAMS.
GRAPPLING DEVICE AND FRUIT-PICKER.
No. 174,102. Patented Feb. 29, 1876.
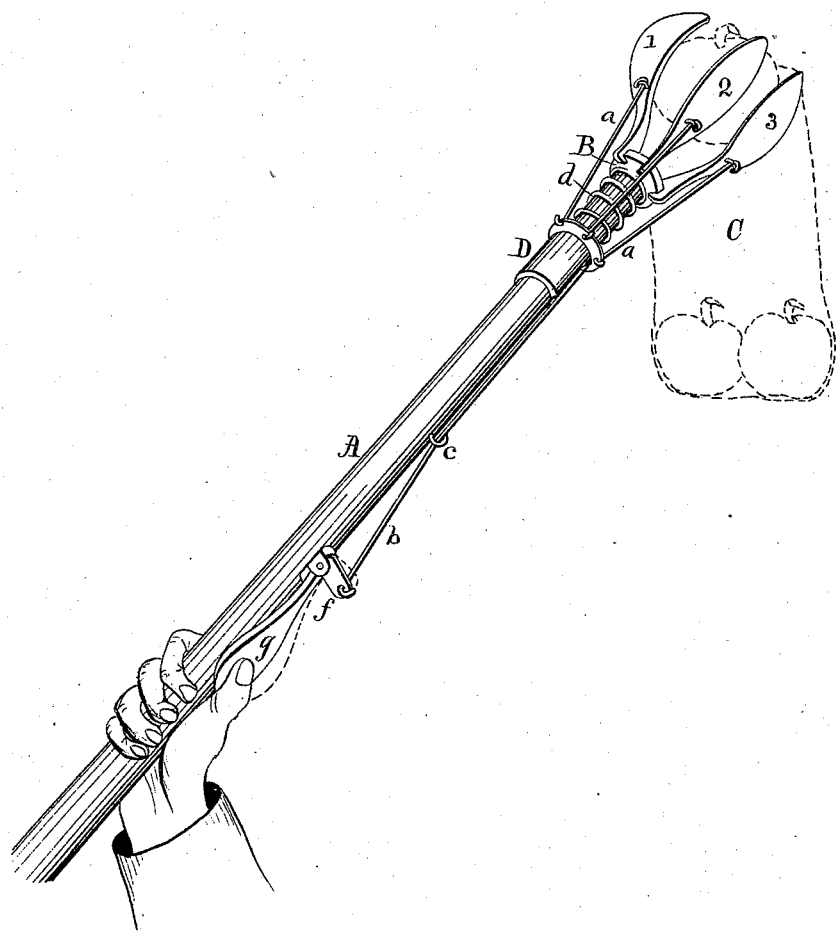
Witnesses:
C. Brannen
C. A. Johnson
Inventor:
James F. Adams
By Thomas G. Orwig atty.

UNITED STATES PATENT OFFICE.

JAMES F. ADAMS, OF POLK CITY, IOWA.

IMPROVEMENT IN GRAPPLING DEVICES AND FRUIT-PICKERS.

Specification forming part of Letters Patent No. 174,102, dated February 29, 1876; application filed October 16, 1875.

*To all whom it may concern:*

Be it known that I, JAMES F. ADAMS, of Polk City, in the county of Polk and State of Iowa, have invented an Improved Grapple and Fruit-Picker, of which the following is a specification:

The object of my invention is to provide an improved means for picking fruit from trees, and for grappling and moving objects not within reach of the hands.

It consists in the combination of a pole, having hinged tines, a movable sleeve, a spring, a rod, and a bell-crank and lever, as hereinafter fully set forth.

My drawing is a perspective view illustrating the construction and operation of my invention.

A is a rigid shaft or pole, that may vary in size, as desired, and may be formed in sections and coupled together in any suitable way. B is a collar or head, rigidly attached to the end of the pole A, for securing the ends of the hinged tines. Nos. 1 2 3 4 are bent fingers or tines, hinged to the head B in any suitable manner. They may vary in size, shape, and number. C represents a flexible sack, attached to the tines Nos. 3 and 4 in any suitable way, into which fruit and other objects may be dropped from the grasp of the tines.

The broken lines indicate how a sack may be attached to the hinged tines to receive the fruit when the tines are opened.

*b* is a rod, attached to the sleeve D, and passes through a series of staples, *c*, or other suitable bearings, to the lower end of the pole A. *d d* is a coil spring, surrounding the shaft A in such a manner as to bear against the head B and sleeve D. *f g* is a combined bell-crank and lever, attached to the pole A in such a manner that the rod *b* may be linked to the crank *f*, and operated by the pressure of the thumb to open, and retain open, the hinged tines 1 2 3, as required, to seize fruit and other objects reached for, and when the pressure of the thumb upon the lever *g* is removed the spring *d* will automatically close the tines upon the object.

I claim as my invention—

The pole A B, having hinged tines 1 2 3, the rods *a*, the movable sleeve D, the spring *d*, the rod *b*, and the crank and lever *f g*, when arranged and combined substantially as and for the purposes set forth.

JAMES FOSTER ADAMS.

Witnesses:
H. B. HEDGE,
CALVIN M. BURT.